United States Patent [19]

Andrews

[11] Patent Number: 4,979,909

[45] Date of Patent: Dec. 25, 1990

[54] RELEASE APPARATUS FOR COMPUTER MASS STORAGE DEVICES

[75] Inventor: Jonathan N. Andrews, Corvallis, Oreg.

[73] Assignee: Hewlett-Packard Company, Palo Alto, Calif.

[21] Appl. No.: 454,660

[22] Filed: Dec. 18, 1989

[51] Int. Cl.$^5$ .......................................... H01R 13/627
[52] U.S. Cl. .................................... 439/352; 211/26; 312/333
[58] Field of Search ................ 439/352, 353; 361/390, 361/391, 393, 394, 395, 399, 415; 211/26, 41, 94, 94.5; 206/444, 387; 312/8-20, 242, 333; 248/27.3

[56] References Cited

U.S. PATENT DOCUMENTS

| | | | |
|---|---|---|---|
| 4,550,944 | 11/1985 | Simon et al. | 312/242 |
| 4,688,131 | 8/1987 | Noda et al. | 361/391 |
| 4,867,311 | 9/1989 | Metcalf | 312/15 |

Primary Examiner—Neil Abrams

[57] ABSTRACT

An apparatus for removing mass storage devices (e.g. disk drives) from the internal support frame in a computer system. The apparatus is used with mass storage devices having resilient, side-mounted engagement members adapted for receipt in openings through the side walls of the support frame to lock the device in position. To remove the device, a rotatable lever is connected to at least one side wall of the support frame. The lever includes at least one projection member positioned adjacent the opening through the side wall to which the lever is connected. To remove the device from the support frame, the lever is rotated so that the projection member contacts the engagement member. Continued rotation of the lever causes the engagement member to be urged inwardly and out of the opening in the side wall. As a result, the device is unlocked from the frame.

10 Claims, 2 Drawing Sheets

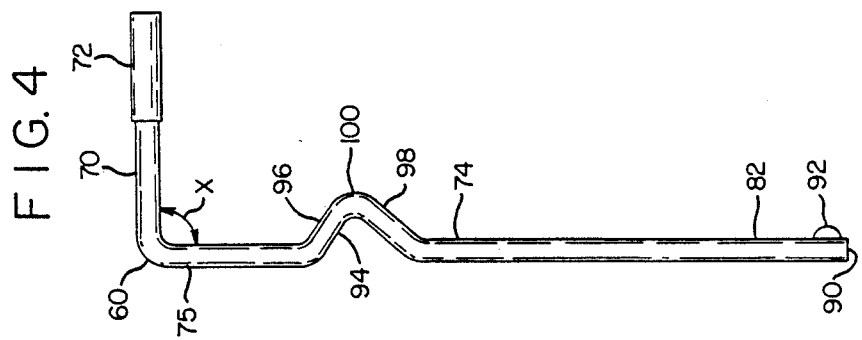
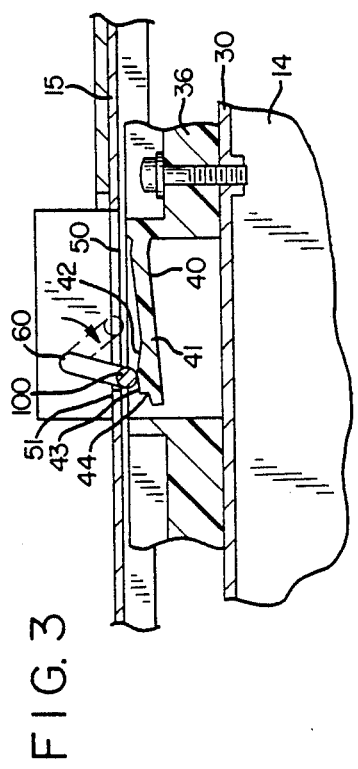
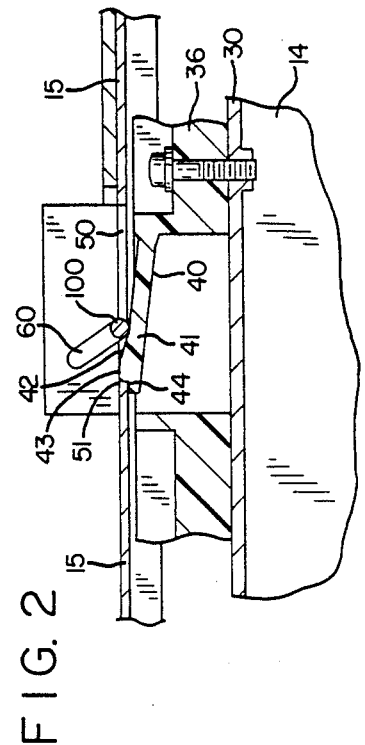

RELEASE APPARATUS FOR COMPUTER MASS STORAGE DEVICES

BACKGROUND OF THE INVENTION

The present invention generally relates to computer data storage systems, and more particularly to an apparatus designed to facilitate the removal of mass storage devices (e.g. disk drives) from computer systems.

Modern computer systems, including portable and desk-top devices incorporate one or more mass storage devices (e.g. disk drives) of variable size and complexity. These devices are typically removable for replacement, repair, or other purposes. A wide variety of different components are used to enable mounting/removal of the devices. For example, in certain systems, the mass storage devices are physically secured in position using screws or other conventional fasteners. Also used is a system which includes resilient, side-mounted engagement members or catches adapted for receipt within openings in the internal support frame of the computer system. This type of system is used in personal computers sold under the VECTRA trademark by the Hewlett-Packard Company of Palo Alto, Calif.

However, a need currently exists for an apparatus which enables the mass storage devices described above to be readily removed with a minimal amount of effort. This is especially true with respect to computer systems which are highly compact and have mass storage devices directly adjacent high voltage components (e.g. cathode ray tube displays.) The present invention satisfies this need, and represents an advance in the art of computer design as described below.

SUMMARY OF THE INVENTION

It is an object of the present invention to provide an apparatus for efficiently removing mass storage devices from computer systems.

It is another object of the invention to provide an apparatus for removing mass storage devices from computer systems which uses a minimal number of operating components.

It is another object of the invention to provide an apparatus for removing mass storage devices from computer systems which is easy to manufacture and use.

It is further object of the invention to provide an apparatus for removing mass storage devices from computer systems which facilitates removal of the devices in a minimal amount of time.

It is a still further object of the invention to provide an apparatus for removing mass storage devices from computer systems which avoids the use of complex mechanical fastening assemblies.

It is an even further object of the invention to provide an apparatus for removing mass storage devices from computer systems which minimizes the possibility of electrical shock to a user during removal of the devices.

In accordance with the foregoing objects, an apparatus for removing mass storage devices (e.g. disk drives) from the internal support frame in a computer system is provided. The apparatus is especially useful in connection with mass storage devices which include resilient side-mounted engagement members adapted for receipt in openings through the side walls of the internal support frame of the computer. In this type of system, as the mass storage device is urged inwardly into the support frame, the engagement members come in contact with the side walls of the support frame and are urged inwardly. When the engagement members reach the openings in the side walls, they automatically move outwardly into the openings. As a result, the mass storage device is locked into the support frame until removal is desired.

In accordance with the present invention, a rotatable control lever is operatively connected to at least one side wall of the support frame. The lever includes at least one outwardly-extending projection member positioned adjacent the opening through the side wall to which the lever is connected. To remove the mass storage device from the support frame, the lever is rotated so that the projection member contacts the engagement member. Continued rotation of the lever causes the engagement member to be urged inwardly and out of the opening in the side wall. As a result, the mass storage device is unlocked from the support frame, and easily removed thereafter.

These and other objects, features, and advantages of the invention will be described below in the following Detailed Description of a Preferred Embodiment and Drawing Figures.

BRIEF DESCRIPTION OF THE DRAWINGS

FIG. 2 is a partial sectional view of FIG. 1 showing the release apparatus of the invention prior to removal of the mass storage device.

FIG. 3 is a partial sectional view of FIG. 1 showing the release apparatus of the invention during removal of the mass storage device.

FIG. 4 is an enlarged side view of the release apparatus of the invention.

DETAILED DESCRIPTION OF A PREFERRED EMBODIMENT

Figure 1:
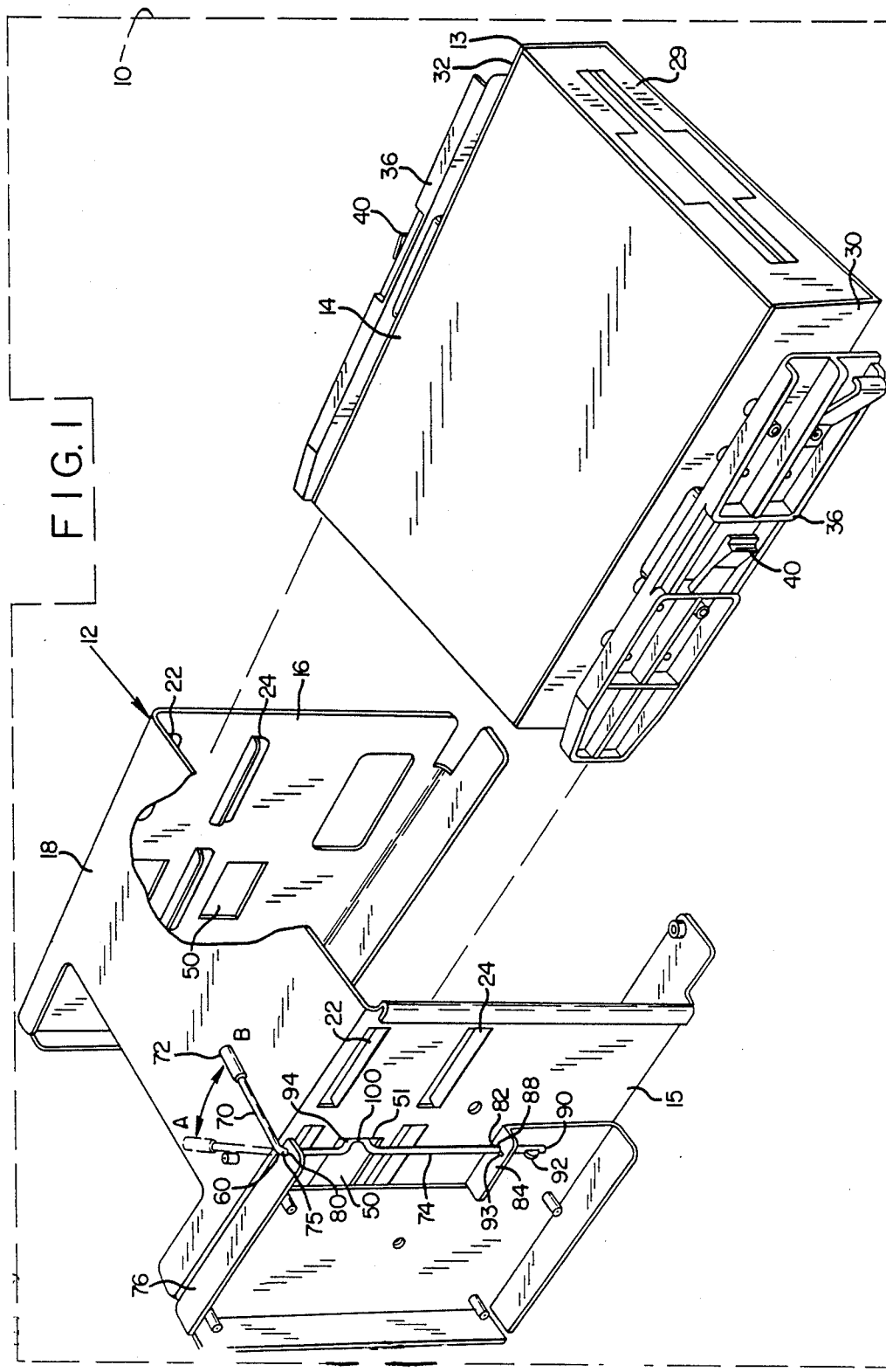
FIG. 1 is a perspective view of a mass storage device after removal from the internal support frame of a computer system incorporating the release apparatus of the present invention.

The present invention involves a highly efficient apparatus for removing mass storage devices (e.g. disk drives) from the internal support frame of a computer system. While the apparatus is shown and described herein with reference to one particular type of computer system and associated hardware, it is equally applicable to other systems known in the art.

With reference to FIG. 1, an internal support frame 12 of a computer unit 10 is illustrated. The support frame 12 is adapted to receive at least one mass storage device 13 known in the art (e.g. a disk drive). The support frame 12 may take a variety of different forms, with the frame 12 shown in FIG. 1 being designed for use in personal computer systems such as the Hewlett Packard VECTRA model.

The support frame 12 includes a first side wall 15, a second side wall 16, and a top portion 18. The first side wall 15 and second side wall 16 each include at least one pair of upper rails 22, and at least one pair of lower rails 24 extending outwardly from walls 15, 16 as illustrated. The rails 22, 24 may each consist of a single unit extending along the entire length of the support frame 12, or may consist of individual sections, as shown in FIG. 1. The upper rails 22 are sufficiently spaced from the lower rails 24 to enable passage of the mass storage device 13 therebetween. In addition, the rails 22, 24 may be integrally formed in the side walls 15, 16, or may be separately attached by screws or other mechanical fasteners known in the art. Multiple sets of rails 22, 24 may be used in computer systems incorporating two or more mass storage devices 13.

While the mass storage device 13 may take a variety of forms, it typically includes a housing 14 having a front face 29, a first side 30, and a second side 32 as illustrated in FIG. 1. The first and second sides 30, 32 each have a slide member 36 of variable design secured thereto by rivets or other mechanical fasteners. The slide members 36 typically extend along the entire length of the mass storage device 13. The slide members 36 are adapted to rest on top of the lower rails 24 of the support frame 12, so that the mass storage device 13 is movably positioned between the upper rails 22 and lower rails 24.

Each of the slide members 36 also includes an outwardly-projecting engagement member 40 which is preferably made of plastic or other resilient material. As shown in FIGS. 2 and 3, each engagement member 40 has a longitudinal section 41 incorporating an upwardly angled top surface 42 having its highest point 43 toward the front face 29 of the mass storage device 13. The function of the angled surface 42 will be described hereinafter. In addition, the longitudinal section 41 of each engagement member 40 includes a notch portion 44 adjacent point 43 as illustrated, the function of which will also be described below.

Each engagement member 40 is adapted for receipt within an opening 50 in each of the side walls 15, 16 as shown in FIGS. 1-3. With reference to FIG. 2, each engagement member 40 is designed to extend outwardly into an opening 50 due to the resilient character thereof. Also, the leading edge 51 of the each opening 50 is designed for receipt within the notch portion 44 of an engagement member 40 in order to prevent removal of the mass storage device 13 from the support frame 12.

To mount the mass storage device 13 within the support frame 12, the device 13 is positioned between the upper and lower rails 22, 24 and urged inwardly. The engagement members 40 are structurally designed to come in contact with the inner surfaces of the side walls 15, 16. As a result, the engagement members 40 are urged inwardly as the mass storage device 13 is mounted within the support frame 12. When the engagement members 40 encounter the openings 50 in the side walls 15, 16, they immediately spring outward, extending into the openings 50. As a result, the mass storage device 13 is effectively locked in position within the support frame 12 and cannot be removed until the engagement members 40 are entirely displaced from the openings 50.

The present invention involves an apparatus for rapidly and effectively displacing the engagement members 40 from the openings 50 described above. Prior to development of the present invention, it was necessary to manually (by hand) urge the engagement members 40 inward to displace them from the openings 50. This was often difficult and time consuming, especially in a small computer system having components which were tightly arranged with little space therebetween. Also, manual manipulation of the engagement members 40 in these systems frequently required a user's hand to be placed in direct proximity with high voltage devices including cathode ray display units.

In accordance with the present invention, an apparatus is provided which avoids or minimizes the need to manipulate the engagement members 40 by hand. As illustrated in FIG. 1, a control lever 60 is used which greatly facilitates displacement of the engagement members 40 from the openings 50 in the support frame 12. In a preferred embodiment, the lever 60 is manufactured of a suitably configured, single-piece metal rod.

In the structure of the FIG. 1, only one lever 60 is provided adjacent side wall 15. As indicated above, the basic structures shown in FIG. 1 are comparable to those used in the Hewlett Packard VECTRA Computer. In this computer, side wall 16 of the support frame 12 is directly adjacent a removable panel (not shown) which provides clear access to the engagement member 40 extending through side wall 16. However, the engagement member 40 through side wall 15 is not readily accessible, thereby justifying the use of lever 60 as illustrated. Notwithstanding the structure shown in FIG. 1, the present invention shall be deemed to include embodiments in which dual levers 60 are used adjacent both side walls 15, 16 of the support frame 12.

With reference to FIGS. 1 and 4, the lever 60 includes a first section 70 adjacent to and parallel with the top portion 18 of the support frame 12. The first section 70 may include an optional handle 72 made of an insulating material (e.g. plastic). Extending downwardly from the first section 70 at a preferred angle "X" of about 90 degrees is a second section 74. The upper portion 75 of the second section 74 is maintained in position adjacent side wall 15 of the support frame 12 using a mounting bracket 76 secured to the side wall 15 in a perpendicular orientation as illustrated in FIG. 1. Specifically, the upper portion 75 passes through an opening 80 in the mounting bracket 76. The diameter of the opening 80 is larger than the diameter of the upper portion 75 so that the upper portion 75 may freely rotate therein.

The lower portion 82 of the second section 74 is maintained in position using a mounting bracket 84 which is also secured to the side wall 15 in a perpendicular orientation. In addition, the bracket 84 is parallel with the bracket 76 as illustrated.

The lower portion 82 passes through an opening 88 in the mounting bracket 84. The diameter of the opening 88 is larger than the diameter of the lower portion 82 so that the lower portion 82 may freely rotate therein.

To prevent removal of the lower portion 82 from the opening 88, the end 90 of the lower portion 82 includes at least one outwardly projecting stop member 92 which is sufficiently large to prevent passage of the member 92 and lower portion 82 through the opening 88. In a preferred embodiment, the opening 88 includes a notch 93 sized to allow passage of the stop member 92 therethrough during attachment of the lever 60 to the support frame 12. Accordingly, the end 90 of the lower portion 82 will not pass through the opening 88 unless the stop member 92 is exactly aligned with the notch 93.

Positioned between the upper portion 75 and the lower portion 82 of the lever 60 is at least one outwardly-extending projection member 94. The number of projection members 94 used on the lever 60 may be varied, depending on the number of mass storage devices in the computer system. In the embodiment of FIG. 1. one projection member 94 is shown, which is directly adjacent and over the opening 50 in the side wall 15 of the support frame 12. The projection member 94 may take a variety of forms. For example, it may be manufactured as an integral part of the lever 60, or it may consist of a separate structure attached to the lever 60.

As shown in the embodiment of FIG. 4, the projection member 94 is an integral part of the lever 60, and consists of a bent region which includes legs 96, 98. The legs 96, 98 converge at a blunt apex 100 as illustrated.

In operation, the lever 60 is freely rotatable between a first position "A" and a second position "B". When the mass storage device 13 is loaded into the support frame 12, the lever 60 is in position "A" (FIG. 2). In this mode, the apex 100 of the projection member 94 is positioned so that it does not prevent the engagement member 40 from being received in the opening 50 in side wall 15. To subsequently remove the mass storage device 13 from the support frame 12, the lever 60 is rotated to the "B" position (FIG. 3). In this mode, the blunt apex 100 of the projection member 94 is firmly urged along the upwardly angled surface 41 of the engagement member 40 in the opening 50, causing the engagement member 40 to be pushed inward and completely out of the opening 50 as illustrated. After displacement of the engagement member 40 from the opening 50 in side wall 16 (either by the use of another lever 60 or by hand as indicated above) the mass storage device 13 may be easily withdrawn from the support frame 12.

The present invention enables mass storage devices to be removed in a rapid, safe and efficient manner. Removal entirely by hand will no longer be required, which offers numerous advantages, including the reduction of electrical shock hazard.

Having herein described a preferred embodiment of the invention, it is anticipated that suitable modifications may be made thereto by those skilled in the art within the scope of the invention. For example, the lever system described herein may be used in connection with a wide variety of computer systems and mass storage devices other than those described above. Also, the physical design of the lever and projection member(s), as well as the mounting hardware for the lever may be suitably varied as long as the invention preforms in the same manner for the same purpose to achieve the same result. This, the invention shall only be construed in accordance with the following claims:

I claim:

1. A computer system comprising:
   at least one mass storage device contained within a housing, said housing comprising first and second side portions, at least one of said side portions having a resilient engagement member extending outwardly therefrom;
   a support frame adapted to removably receive said mass storage device therein, said support frame comprising a top wall, and first and second side walls, at least one of said side walls having an opening therethrough sized to receive said engagement member, the mounting of said mass storage device within said support frame causing said engagement member to contact said one of said side walls having said opening therethrough and move inwardly during said mounting until said engagement member reaches said opening, said engagement member thereafter moving outwardly into and through said opening to lock said mass storage device within said support frame; and
   a lever rotatably secured to said support frame adjacent said one of said sidewalls having said opening therethrough, said lever comprising at least one outwardly extending projection member thereon, said lever being rotatable between a first and second position, said projection member being positioned outwardly from said opening when said lever is in said first position, said projection member being positioned within said opening and against said engagement member when said lever is in said second position in order to push said engagement member inwardly and out of said opening.

2. The computer system of claim 1 wherein said first and second side walls of said support frame each comprise one opening therethrough, and said first and second side portions of said mass storage device each comprise one engagement member thereon.

3. A computer system comprising:
   at least one mass storage device contained within a housing, said housing comprising first and second side portions, at least one of said side portions having a resilient engagement member extending outwardly therefrom;
   a support frame adapted to removably receive said mass storage device therein, said support frame comprising a top wall, and first and second side walls, at least one of said side walls having an opening therethrough sized to receive said engagement member, the mounting of said mass storage device within said support frame causing said engagement member to contact said one of said side walls having said opening therethrough and move inwardly during said mounting until said engagement member reaches said opening, said engagement member thereafter moving outwardly into and through said opening to lock said mass storage device within said support frame; and
   a lever rotatably secured to said support frame adjacent said one of said side walls having said opening therethrough, said lever comprising at least one outwardly extending projection member thereon, the rotation of said lever causing said projection member to move toward and against said engagement member in order to urge said engagement member inwardly and out of said opening, said engagement member comprising a top portion having an upwardly angled surface, said projection member being urged along and against said angled surface during the removal of said mass storage device from said support frame.

4. The computer system of claim 12 wherein said lever comprises:
   a first elongate section adjacent to and parallel with said top wall of said support frame; and
   a second elongate section connected to said first elongate section, said second elongate section being adjacent to and parallel with said one of said side walls having said opening therethrough, said second elongate section being positioned directly over said opening.

5. The computer system of claim 4 wherein said second elongate section comprises said projection member thereon, said projection member being in direct alignment with said opening so as to enable said projection member to move toward and against said engagement member upon the rotation of said lever.

6. The computer system of claim 4 wherein said second elongate section of said lever comprises a rod member having a bent section therein, said bent section terminating in an apex extending outwardly from said rod member, said bent section comprising said projection member.

7. A computer system comprising:
   at least one mass storage device contained within a housing, said housing comprising first and second side portions, at least one of said side portions having a resilient engagement member extending outwardly therefrom;
   a support frame adapted to removably receive said mass storage device therein, said support frame comprising a top wall, and first and second side walls, at least one of said side walls having an opening therethrough sized to receive said engagement member, the mounting of said mass storage device within said support frame causing said engagement member to contact said one of said side walls having said opening therethrough and move inwardly during said mounting until said engagement member reaches said opening, said engagement member thereafter moving outwardly into and through said opening to lock said mass storage device within said support frame; and
   release means operatively connected to said support frame for urging said engagement member out of said opening in order to enable the unlocking and removal of said mass storage device from said support frame, said release means comprising a lever rotatably secured to said support frame, said lever comprising a first elongate section adjacent to and parallel with said top wall of said support frame, and a second elongate section connected to said first elongate section, said second elongate section being adjacent to and parallel with said one of said side walls having said opening therethrough, said second elongate section comprising at least one outwardly extending projection member thereon being in direct alignment with said opening, the rotation of said lever causing said projection member to move toward and against said engagement member in order to urge said engagement member inwardly and out of said opening.

8. The computer system of claim 7 wherein said second elongate section of said lever comprises a rod member having a bent section therein, said bent section terminating in an apex extending outwardly from said rod member, said bent section comprising said projection member.

9. The computer system of claim 8, wherein said first and second side walls of said support frame each comprise one opening therethrough, and said first and second side portions of said mass storage device each comprise one engagement member thereon.

10. The computer system of claim 9, wherein said engagement member comprises a top portion having an upwardly angled surface, said projection member being urged along and against said angled surface during the removal of said mass storage device from said support frame.

* * * * *